United States Patent [19]

Fairbairn et al.

[11] Patent Number: 4,507,858

[45] Date of Patent: Apr. 2, 1985

[54] APPARATUS FOR MAKING AN ELECTRICAL CONTACT

[75] Inventors: Leroy W. Fairbairn, Sidney; Clifford R. Waldron, Niverville, both of N.Y.

[73] Assignee: Allied Corporation, Morristown, N.J.

[21] Appl. No.: 544,349

[22] Filed: Oct. 24, 1983

Related U.S. Application Data

[63] Continuation of Ser. No. 324,714, Nov. 24, 1981, Pat. No. 4,433,482, which is a continuation of Ser. No. 84,959, Nov. 15, 1979, abandoned.

[51] Int. Cl.[3] .......... B23P 19/00

[52] U.S. Cl. .......... 29/747; 29/761

[58] Field of Search .......... 29/268, 747, 882, 761, 29/520, 283.5, 797; 72/409

[56] References Cited

U.S. PATENT DOCUMENTS

| | | |
|---|---|---|
| 1,272,700 | 7/1918 | Newcomb . |
| 2,340,360 | 2/1944 | Alden . |
| 3,304,602 | 2/1967 | Osborne . |
| 3,725,844 | 4/1973 | McKeown et al. . |
| 4,072,394 | 2/1978 | Waldrow et al. . |

*Primary Examiner*—Howard N. Goldberg
*Assistant Examiner*—Carl J. Arbes
*Attorney, Agent, or Firm*—C. D. Lacina

[57] ABSTRACT

An apparatus for simultaneously forming a radial collar (16) medially of an axial electrical contact of the type having a forward shoulder portion (14) and a rearward termination portion (18) and assembling a plurality of straight wires (24) into an axially passage (22) coaxially disposed with the shoulder portion, the apparatus being characterized by: a generally cylindrical male member (36) having a cylindrical hole (38) sized to receive and mount the termination portion (18); and a receiving member (46) including a collar portion (47) having an inwardly extending aperture (48) sized to receive the shoulder portion (14), the aperture having a cross-section slightly less than the outer diameter of the shoulder portion, the receiving member (46) being spaced from the male member (36), the axis of the hole (38) and the aperture (48) being generally coaxial with one another, and the members being adapted to be driven towards one another whereby the receiving member (46) simultaneously squeezes both radially and axially against the shoulder portion (14).

3 Claims, 5 Drawing Figures

APPARATUS FOR MAKING AN ELECTRICAL CONTACT

This application is a continuation of application Ser. No. 324,714, filed Nov. 24, 1981 now U.S. Pat. No. 4,433,482, which was a continuation of application Ser. No. 84,959, filed Nov. 15, 1979, now abandoned.

TECHNICAL FIELD

This invention relates to methods for making electrical contacts and, in particular, to methods for securing axially aligned electrical conducting fine wires within the axial passage of a contact holder.

BACKGROUND ART

Prior patents disclose an electrical brush contact intended to hve fine wires inserted into a barrel and crimped to comprise a contact. For example, the U.S. patent of McKeown et al., U.S. Pat. No. 3,725,844 discloses a hermaphroditic electrical contact wherein seven or more wires are crimped at one or more positions to secure the wires within the inner portion of a passage formed therein. As suggested in the above patent, the wires could be soldered or brazed into position so long as the wires are in electric circuit relationship with one another. The crimping operation may be performed by a well-known plier type tool that, when squeezed, applies pressure simultaneously to two pairs of diametrically opposed points of the contact to conform the contact wall to the wires within the contact.

Each of the contacts and the wires associated with such a contact are quite small (the contacts being about one-half of an inch long with a diameter of about 0.092 inches). Generally, electrical contacts are machined from metal stock and, because of their small size, the contacts are machined to tolerances of 0.002 inches or less. A contact which is oversize for any reason cannot be utilized because it may not be possible to insert such a contact into the contact receiving holes of a connector insert, or insufficient clearance between contacts could cause electrical and mechanical problems. Also, because such electrical contacts are generally machined from metal stock, the largest desired diameter of the finished contact determines the smallest diameter that the metal stock can be.

Machining of electrical contacts is expensive and because of the large number of contacts utilized by a connector and the attendant material costs, the connector is relatively expensive. Therefor, to reduce the cost of manufacturing a connector, material and machining costs should be kept to a minimum. Also, the cost of manufacturing the connector can obviously be reduced if the number of manufacturing steps to produce a contact is also reduced to thereby provide further savings. At the same time, the fine wires of the contact must be secured within the contact holder in such a way as to provide a good electrical and mechanical connection therebetween.

DISCLOSURE OF THE INVENTION

An object of the present invention is to provide an electrical contact that is simple in construction and economical to manufacture.

Another object of this invention is to replace expensive machined electrical contacts with inexpensive electrical contacts wherein axially aligned fine wires are secured within the axial passage of the contact holder by pressure swaging the holder from the forward end of the passage toward the rear end of the passage in an axial direction.

A further object of the invention is to provide an electrical contact wherein several axially aligned fine wires are secured within an axial passage of the contact holder and a retention collar is formed in one manufacturing step.

It is still another object of the invention to provide an electrical contact wherein several axially aligned fine wires are secured within an axial passage of a contact holder along substantially the entire length of the axial passage to thereby provide a secure mechanical and electrical connection between the wires and the contact holder.

It is yet another object of the present invention to provide an electrical contact having a retention collar wherein the diameter of the retention collar is larger than the diameter of the metal stock from which the electrical contact is formed.

In carrying out the above objects and other objects of this invention, a preferred method of making an electrical contact (10) comprising a holder (12) including an axial passage (22) havng a forward end portion (35) and a rear end portion (30) and several electrical conducting wires (24) axially aligned and axially mounted within the passage, comprises the steps of: inserting the wires into the axial passage and swaging the holder from the forward end portion of the passage towards the rear end portion (30) of the passage in an axial direction to secure the inserted wires within the passage.

In further carrying out the above objects and other objects of this invention, another preferred method of making an electrical contact comprising a holder having a cylindrical shoulder portion formed with an axial passage having a forward end portion and a rear end portion, several electrical conducting wires axially aligned and axially mounted within the passage and a rear termination portion, 18 comprises: inserting the wires into the passage, positioning the mating portion of the contact and swaging the shoulder portion of the holder from the forward end portion of the passage along the entire length of the passage towards the rear end portion of the passage in an axial direction so that as the shoulder portion is pushed axially rearwardly towards the rear termination portion, an outer wall portion is pushed radially outwardly to thereby form medially of the holder a retention collar and an inner wall portion of the shoulder portion defining the axial passage is pushed radially inwardly to thereby secure the wires within the passage.

The objects, features and advantages of the present invention are readily apparent from the following detailed description of the best mode taken in connection with the accompanying drawings.

BEST MODE FOR CARRYING OUT THE INVENTION

Figure 1:
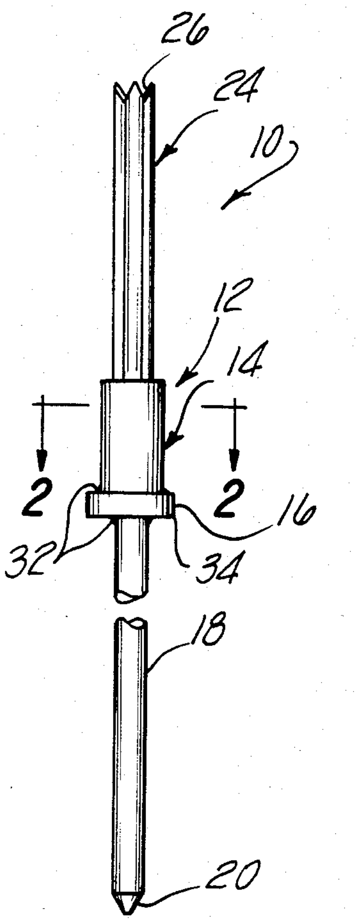
FIG. 1 is a side elevational view, partially broken away, of a finished electrical contact constructed according to the method of this invention.

Referring to FIG. 1, a finished elongated electrical contact generally indicated at 10 is shown constructed according to the method of the present invention. The contact 10 comprises a holder generally indicated at 12 which has a shoulder portion generally indicated at 14, an integrally formed retention collar 16 and an integrally formed rear termination portion 18 having a tapered end 20. The shoulder portion 14 has an axial passage generally indicated at 22 formed through the center of the shoulder portion 14 such as by drilling or extruding.

The contact 10 also includes several electrical conducting fine brush wires generally indicated at 24, preferably comprising seven in number, and which are axially aligned and axially mounted within the passage 22 as described in greater detail hereinafter.

Figure 3:
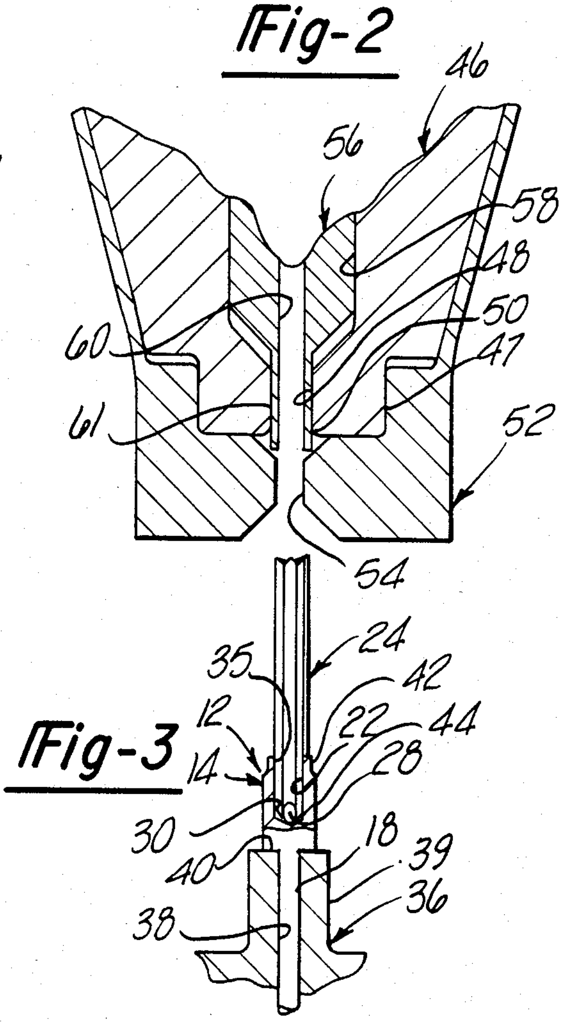
FIG. 3 is a sectional view, partially broken away, illustrating the method of the present invention.

As described in the McKeown et al. U.S. Pat. No. 3,725,844, which patent is hereby incorporated herein by reference, the ends of the wires 24 have tapered or angled opposite end surfaces 26 and 28, as shown in FIGS. 1 and 3, respectively, to facilitate sliding movement upon contact with the wires from another contact (not shown). An example of one preferred material for the wires 24 is beryllium copper wire having a silver coating thereon.

In the preferred embodiment the finished shoulder portion 14 has an outside diameter of about 0.039 inches, the passage 22 is 0.060 inches in length and the shoulder portion 14 has an axial length of approximately 0.085 inches. In this embodiment, the wires 24 have a diameter less than 0.01 inches and greater than 0.001 inches. Preferably, the wires 24 have a length of about 0.15 inches and a diameter of about 0.008 inches.

Preferably, the shoulder portion 14 consists of bronze or other copper alloy having a plating of tin, copper, or silver to provide the shoulder portion 14 with good electrical current carrying characteristics.

A cross-hole which would ordinarily communicate the rear end portion 30 of the passage 22 to the exterior of the contact 10 for fluid plating purposes, is not required since the ratio of the diameter of the passage 22 to the length or depth of the passage 22 prevents the plating fluid from being trapped within the passage 22.

The retention collar 16 preferably has an outer diameter of 0.058 inches and a width of about 0.015 inches. The interconnecting surfaces between the retention collar 16 and the shoulder portion 14, and the termination portion 18 and the reduction collar 16 are slightly rounded at 32. Also, the forward, outer edge surface of the retention collar 16 is slightly rounded at 34.

The retention collar 16 is provided to allow the contact 10 to be retained in a connector molding or insert (not shown) which may have flexible retention fingers to hold the retention collar 16 therebetween. Such connector moldings or inserts are shown in the U.S. patent to Bourdon et al. U.S. Pat. No. 4,082,398 and U.S. patent to Bourdon et al. U.S. Pat. No. 4,157,806, both of which have the same assignee as the present application and both of which are hereby incorporated herein by reference.

The termination portion 18 allows the contact 10 to be terminated or connected to a printed circuit board or to a mother or daughter board in a conventional fashion.

The electrical contact 10 shown in FIG. 1, which is commonly referred to as a hermaphroditic contact, could also be considered to be a "male" contact, may be converted or made into a "female" contact by sliding a stainless steel sleeve concentrically over the shoulder portion 14 so that the sleeve extends beyond the end surfaces 26 of the wires 24. Such a removable sleeve is shown in the U.S. patent to Waldron et al. U.S. Pat. No. 4,072,394 having the same assignee as the present application and which is also hereby incorporated hereby by reference.

Figure 2:
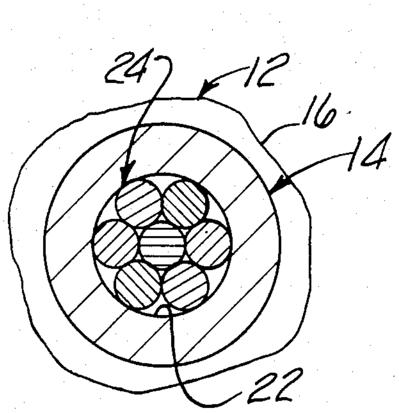
FIG. 2 is a sectional view of the contact taken along line 2—2 of FIG. 1, slightly enlarged for illustrative purposes.
Figure 4:
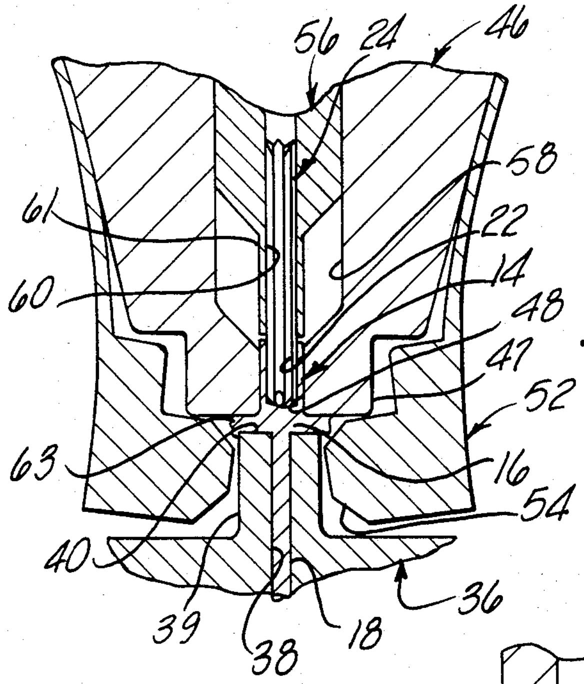
FIG. 4 is a sectional view, partially broken away, illustrating the method of the present invention.
Figure 5:
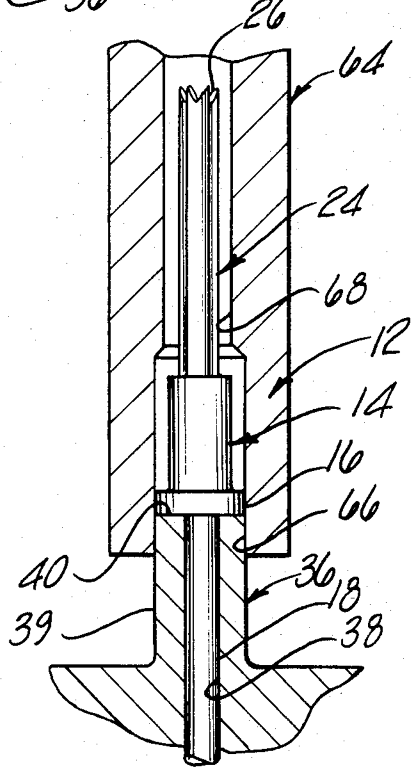
FIG. 5 is a sectional view, partially broken away, illustrating the method of the present invention.

Referring now to FIGS. 3 through 5, there is illustrated a preferred method of making the electrical contact 10 of FIGS. 1 and 2. The wires 24 are inserted into the forward end portion 35 of the passage 22 of the holder 12 so that the inserted ends of the wires 24 extend to the rear end portion 30 of the passage 22. The holder 12 is positioned on a base die generally indicated at 36 so that the termination portion 18 of the holder 12 is disposed within an axial hole 38 formed in a cylindrical portion 39 of the base die 36 and so that the shoulder portion 14 rests on a top, active or working surface 40 of the cylindrical portion 39.

The preformed shoulder portion 14, as shown in FIG. 3, is preferably either turned or extruded from metal stock and includes a tapered end portion 42 of reduced diameter and a cylindrical portion 44. Preferably, the end portion 42 has an outer diameter of 0.040 inches, the cylindrical portion 44 has an outer diameter of 0.048 inches, and the passage 22 has a diameter of 0.029 inches.

The base die 36 is positioned opposite a forming die generally indicated at 46 so that the wires 24 are aligned with an aperture 48 formed through a collar portion 47 of the forming die 46. The forward opening 50 of the aperture is defined by rounded surfaces of the collar portion 47 so that the wires 24 may be easily inserted therethrough.

Concentrically disposed about the forming die 46 is an expandable alignment collet generally indicated at 52 which has an inwardly tapered opening 54 for guding the ends of the wires 24 into the aperture 48. An extendable and retractable knockout generally indicated at 56 is slidably disposed within an axial bore 58 formed in the forming die 46. The knockout 56 has an axial hole 60 extending therethrough and includes an integral, axially extending cylindrical portion 61 for engaging the shoulder portion 14 at its end portion 42, as will be described in greater detail hereinafter.

Referring now to FIG. 4, the dies 36 and 46 are moved towards each other so that the wires 24 move upwardly into the hole 60. The drive means for moving the dies 36 and 46 towards one another is not shown since it is not critical to an understanding of the invention and may comprise any suitable power source which may cooperate with gears, a great train of pulleys or other mechanical expedients which will develop sufficient mechanical force to axially squeeze the shoulder portion 14 and form the medial retention collar 16. The aperture 48 of the forming die 46 is slightly smaller (on the order of one-thousandth of an inch) than the outer diameter of the end portion 42 of the shoulder portion 14. Therefore, as the dies 36 and 46 are moved together, the rounded surfaces of the collar portion 47 defining the opening 50 engage the end portion 42 and subsequently, the cylindrical portion 44 of the shoulder portion 14, and are pushed or squeezed radially inwardly to secure the wires 24 within the axial passage 22. At the same time, the end portion 42 of the shoulder portion 14 moves the knockout 56 axially inwardly in the bore 58, and the flexible alignment collet 52 moves radially outwardly to allow the passage of the cylindrical portion 39 of the die 36 upwardly into the opening 54.

The forming die 46 and the base die 36 swage the shoulder portion 14 of the holder 12 by cold working the shoulder portion 14 to reduce the outer diameter of the shoulder portion 14 to substantially equal the diameter of the aperture 48 of the forming die 46 which, in the preferred embodiment, is 0.039 inches.

As the two dies 46 and 36 move further together, the cylindrical portion 39 of the die 46 pushes the outermost circumferential layer or outer wall portion of the shoulder portion 14 in an axial direction towards the termination portion 18 so that an outer wall portion is pushed radially outwardly to form the retention collar 16. The formed retention collar 16 has a rough outer circumferential layer 63 which is later trimmed, as will be described in greater detail hereinafter.

After the shoulder portion 14 of the holder 12 has been swaged by cold working, the knockout 56 is extended outwardly in an axial direction so that the cylindrical portion 61 engages the axially aligned end portion 42 of the shoulder portion 14 to thereby push or knock out the holder 12 from within the aperture 48.

Referring now to FIG. 5, the rough outer circumferential layer 63 of the retention collar 16 is trimmed or cut off by a trimming die, generally indicated at 64, and the base die 36. The holder 12, which is still positioned on the base die 36, is moved into an axial bore 66 of the trimming die 64 which has a diameter slightly larger than the outer diameter of the cylindrical portion 39 to thereby trim off the outer circumferential layer 63 of the retention collar 16 which extends over the sides of the cylindrical portion 39 of the base die 36. The trimming die 64 also includes a second axial bore 68 of reduced diameter to allow the wires 24 to extend upwardly into the trimming die 64 during the trimming operation. The finished contact 10 is then removed from the base die 36.

While a preferred embodiment of an improved method of securing wires within an axial passage of a contact holder has been described herein in detail, those skilled in this art will recognize various alternative designs and embodiments for practicing the present invention as defined by the following claims.

What is claimed is:

1. In an apparatus for simultaneously forming a radial collar medially of an axial electrical contact of the type having a forward portion and a rearward portion coaxially disposed, the apparatus characterized by:

a generally cylindrical male member having an action surface and a cylindrical hole extending inwardly from the action surface, said hole being sized to receive said rearward portion so that said forward portion extends forwardly of the action surface;

a receiving member including a collar portion having a generally cylindrical aperture extending axially inward from a face thereof, said aperture being sized to receive the forward portion and having a diameter slightly less than a dimension defining the outer cross-section of said forward portion, said receiving member being disposed in spaced apart relation to said male member, the axis of said hole being generally coaxial with the axis of said aperture and one of said members being adapted to be moved axially towards the other of said members; and means for positioning said members so that said hole and said aperture have their axes coaxially aligned whereby as the male member is moved towards the receiving member, said forward portion advances into the aperture, whereupon the walls defining the aperture engage the forward portion of the contact, further advance of the members squeezing some of the outer wall of the forward portion radially inward and pushing other of the outer wall axially rearward and radially outward to form a medial collar.

2. The apparatus as recited in claim 1 and further characterized by: a radially expandable alignment collar disposed concentrically about the receiving member, said alignment collar having an inwardly tapered opening for receiving the male member and guiding the forward portion to the aperture, whereby as the male member is moved towards the receiving member, the opening receives and guides the forward portion to the aperture and the dimensional difference between the aperture and the forward portion deforms the contact and causes the medial collar to be squeezed radially outward, the collar so formed radially expanding the alignment collar outwardly to allow passage of the male member into the opening.

3. The apparatus as recited in claim 2 and further characterized by means for driving the two movable die members together.

* * * * *